(12) United States Patent
De La Rosa

(10) Patent No.: US 9,887,049 B2
(45) Date of Patent: Feb. 6, 2018

(54) MAGNETIC MODULAR ASSEMBLY FOR BEHAVIORAL STUDIES

(71) Applicant: Claudio Alfredo De La Rosa, Bogota (CO)

(72) Inventor: Claudio Alfredo De La Rosa, Bogota (CO)

( * ) Notice: Subject to any disclaimer, the term of this patent is extended or adjusted under 35 U.S.C. 154(b) by 88 days.

(21) Appl. No.: 14/532,936

(22) Filed: Nov. 4, 2014

(65) Prior Publication Data

US 2015/0122194 A1   May 7, 2015

Related U.S. Application Data

(60) Provisional application No. 61/899,882, filed on Nov. 5, 2013.

(51) Int. Cl.
| | |
|---|---|
| *A01K 1/03* | (2006.01) |
| *H01H 3/02* | (2006.01) |
| *A01K 1/035* | (2006.01) |
| *A01K 15/02* | (2006.01) |
| *A01K 29/00* | (2006.01) |

(52) U.S. Cl.
CPC .............. *H01H 3/02* (2013.01); *A01K 1/031* (2013.01); *A01K 1/035* (2013.01); *A01K 15/025* (2013.01); *A01K 29/005* (2013.01)

(58) Field of Classification Search
CPC ... A01K 1/031; F16B 2001/0035; A63J 11/00
USPC ............ 119/417; 439/38–40; 446/92; 472/62
See application file for complete search history.

(56) References Cited

U.S. PATENT DOCUMENTS

| | | | | |
|---|---|---|---|---|
| 6,575,462 | B2* | 6/2003 | Roy ......................... | A63J 11/00 273/118 R |
| 6,969,294 | B2* | 11/2005 | Vicentelli ................. | G09F 7/04 446/129 |
| 7,066,778 | B2* | 6/2006 | Kretzschmar ........ | A63H 33/046 446/124 |
| 7,137,898 | B2* | 11/2006 | Savage .................... | A63J 11/00 472/62 |
| 7,273,404 | B2* | 9/2007 | Kowalski ............. | A63H 33/046 446/114 |
| 7,955,155 | B2* | 6/2011 | Tremblay ............. | A63H 33/046 446/85 |
| 8,286,591 | B2* | 10/2012 | Moffett-Chaney ....... | E06B 7/32 119/484 |
| 8,458,863 | B2* | 6/2013 | Hunts ................... | H01F 7/0242 24/303 |

(Continued)

*Primary Examiner* — Joshua T Kennedy

(57) ABSTRACT

A modular assembly set system for use in modular constructions suitable for behavioral research made of a polycarbonate, acrylic or other material walls with magnetic edges, joints and parts with a support base (floor) made of magnetically active metal sheet glued over a plastic inert polymer surface (or one of similar inert properties). The system comprises a multi-piece set that allows the building of different mazes or structures for use in behavioral, memory and health sciences studies. The magnetic edges of the walls along with joints and other pieces attaches to the metal base (floor) and permits to modularly build any configuration. The use of this device can be extended to virtually any kind of modular construction (toys, provisional constructions, stands and other low weight assemblies). The walls and floor set can be used many times, and assemble and disassemble as required.

1 Claim, 22 Drawing Sheets

(56) References Cited

U.S. PATENT DOCUMENTS

| | | | | |
|---|---|---|---|---|
| 9,022,829 B2* | 5/2015 | Rosen | ............... | A63H 33/046 446/108 |
| 2007/0037469 A1* | 2/2007 | Yoon | ............... | A63H 33/046 446/92 |
| 2010/0056013 A1* | 3/2010 | Kaplan | ............... | A63H 33/046 446/92 |
| 2014/0227934 A1* | 8/2014 | Rudisill | ............... | A63H 33/046 446/92 |
| 2015/0027079 A1* | 1/2015 | Pantev | ............... | F16B 5/0084 52/582.2 |
| 2015/0231521 A1* | 8/2015 | Peterson | ............... | A63H 33/046 446/92 |
| 2016/0184727 A1* | 6/2016 | Ornstein | ............... | A63H 33/046 446/92 |

* cited by examiner

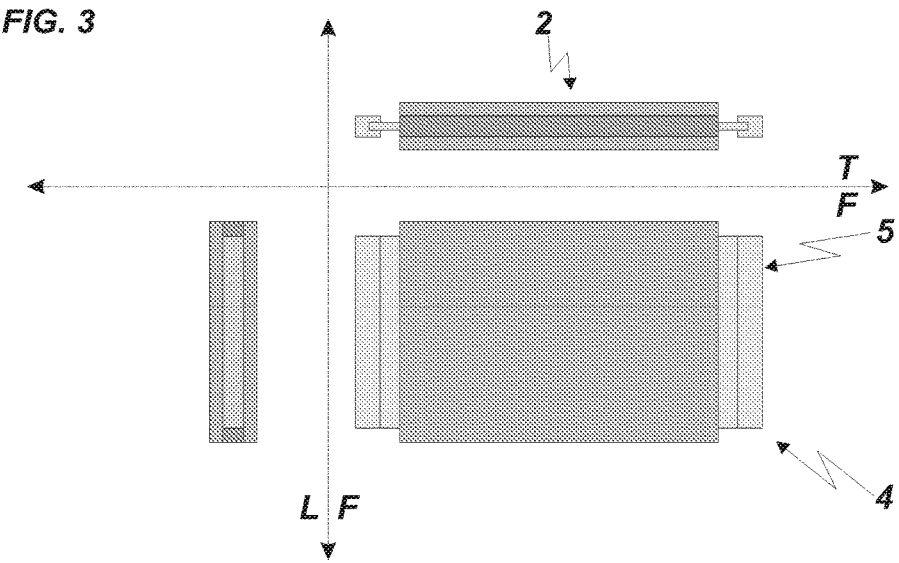
FIG. 3
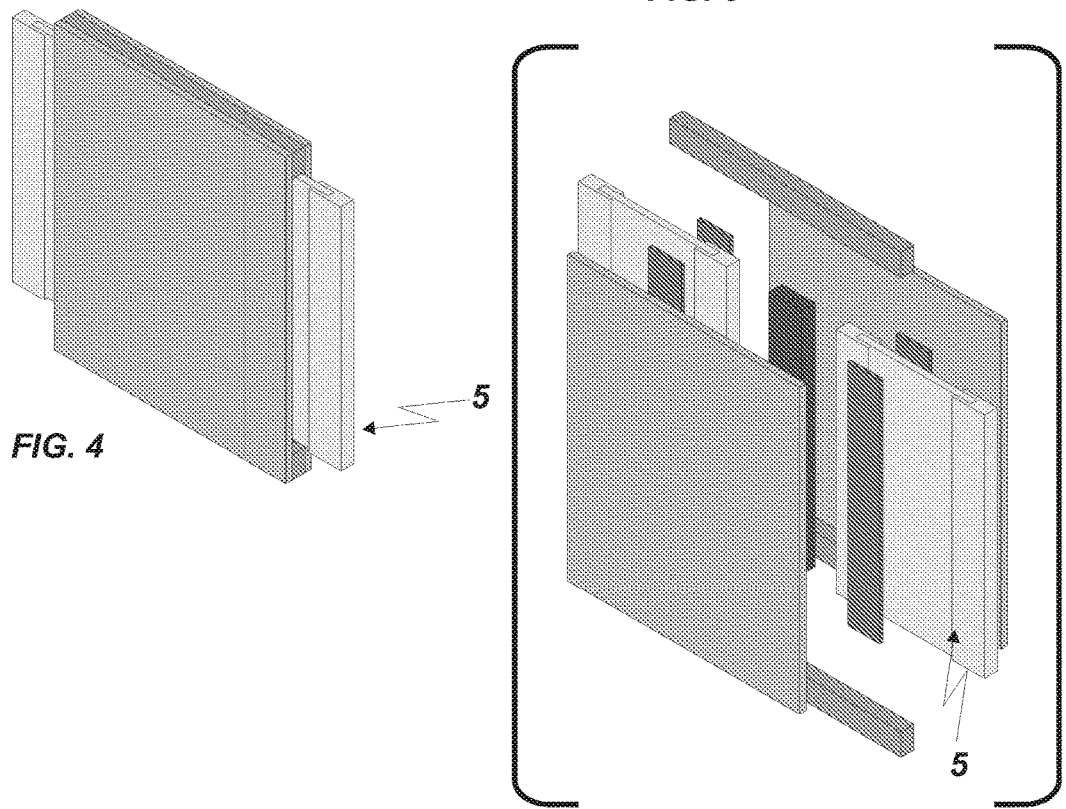
FIG. 4
FIG. 5

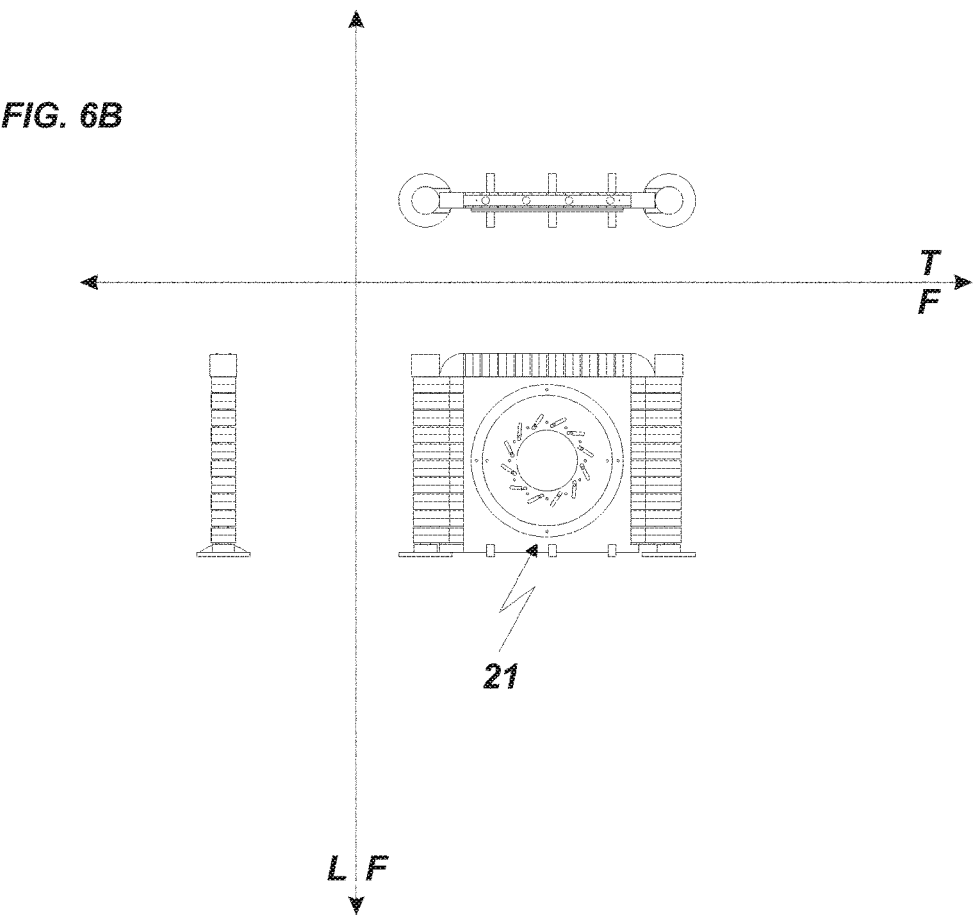
FIG. 6B
21
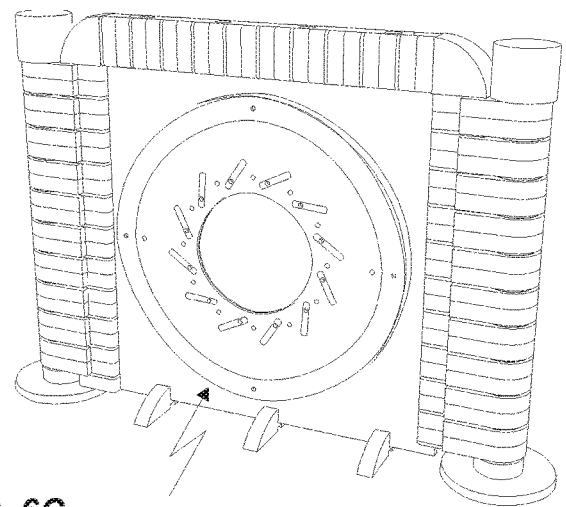
FIG. 6C    21

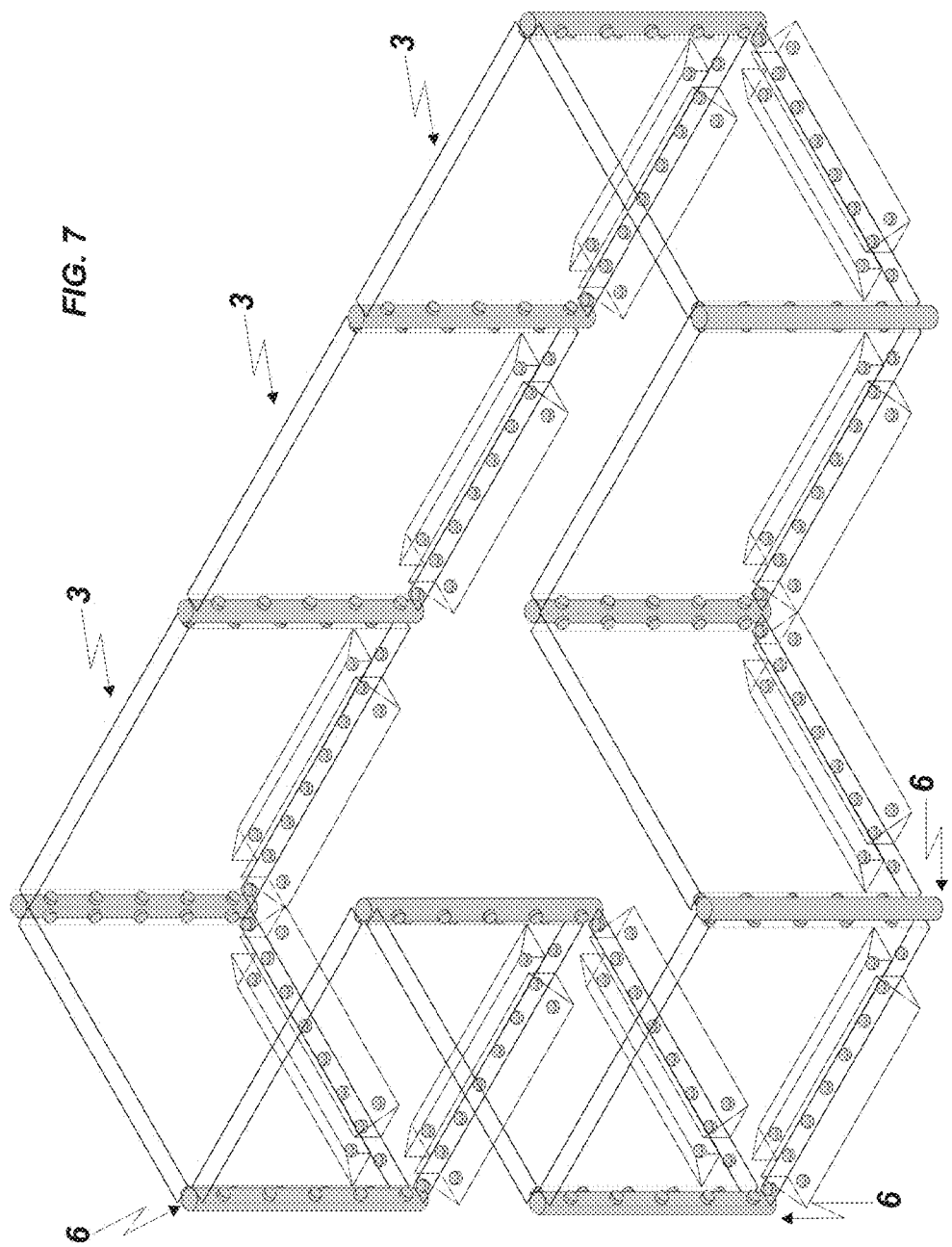

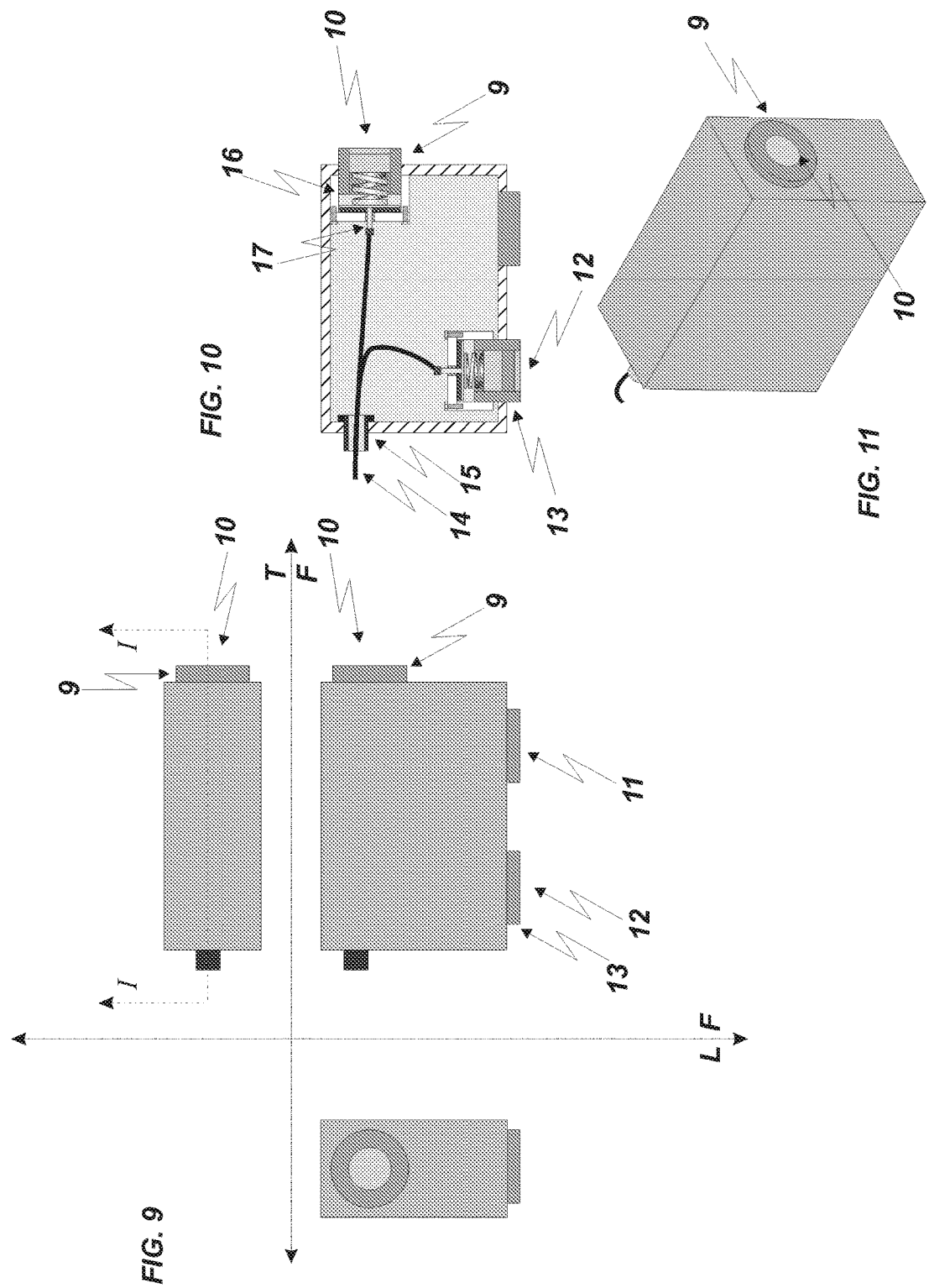

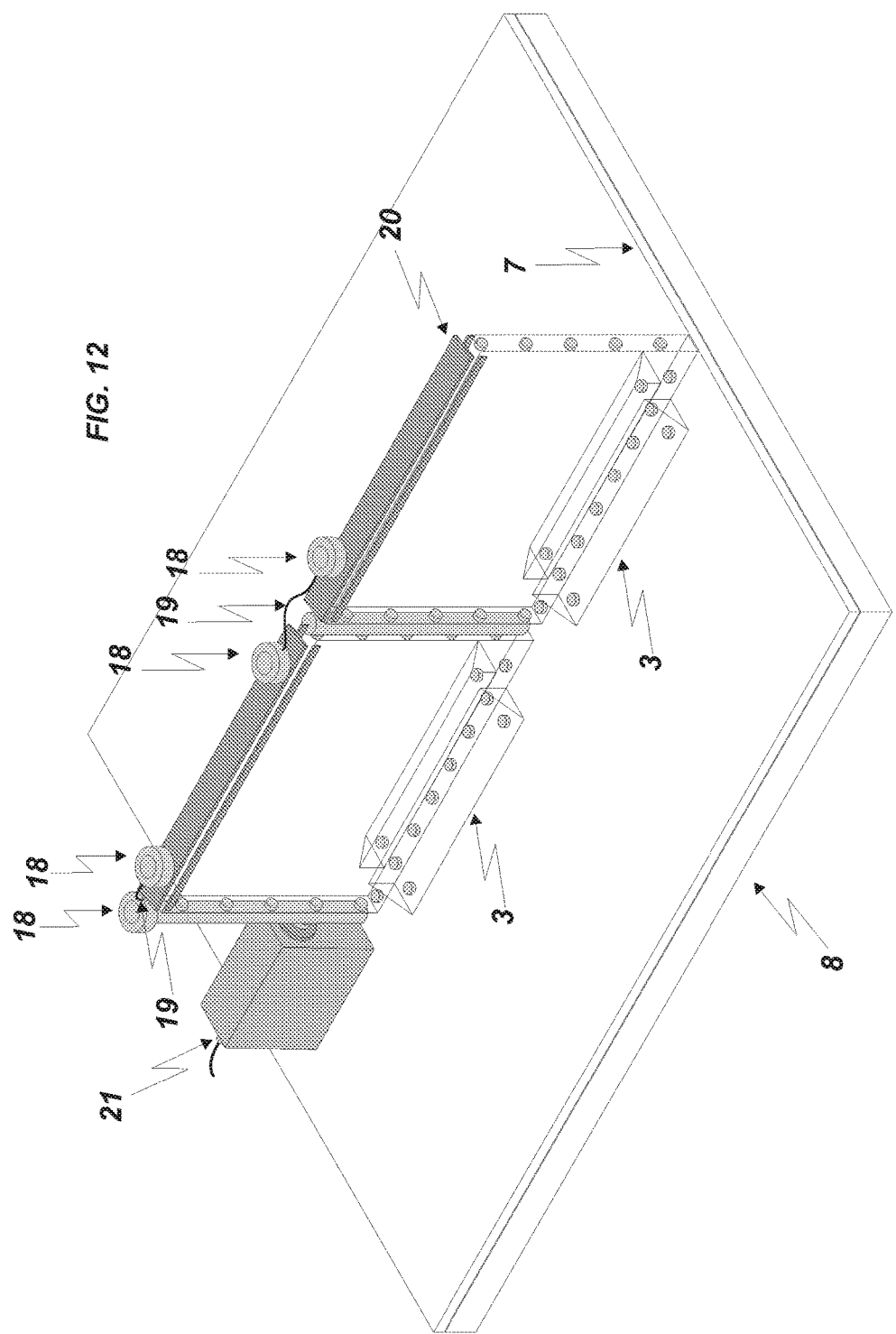

MAGNETIC MODULAR ASSEMBLY FOR BEHAVIORAL STUDIES

REFERENCE TO RELATED APPLICATIONS

The process of this initial application started with a provisional application filled on Nov. 5, 2013, with provisional application No. 61/899,882. The aforementioned provisional application is hereby incorporated herein by reference. The benefit of prior U.S. Provisional Patent Application is therefore claimed.

REFERENCES

| | | |
|---|---|---|
| 3,100,473 | August 1963 | Kissel |
| 3,516,389 | June 1970 | Meyer |
| 3,857,364 | December 1974 | Miller, Jr. |
| 3,974,798 | August 1976 | Meetze, J |
| 4,337,726 | July 1982 | Czekajewski et al. |
| 4,574,734 | March 1986 | Mandalaywala et al. |
| 4,850,592 | July 1989 | Winter |
| 4,953,502 | September 1990 | Hoover |
| 4,968,974 | November 1990 | Sakano |
| 5,095,852 | March 1992 | Hoover |
| 5,393,074 | February 1995 | Bear et al. |
| 5,549,884 | August 1996 | Weinberger et al. |
| 5,816,256 | October 1998 | Kissinger et al. |
| 5,915,332 | June 1999 | Young et al. |
| 6,123,047 | September 2000 | Sakai |
| 6,273,026 | August 2001 | Ferster et al. |
| 6,675,538 | January 2004 | Candio |
| 6,678,413 | January 2004 | Liang et al. |
| 6,837,184 | January 2005 | Gondhalekar et al. |
| 7,654,910 | February 2010 | Chen |
| 7,841,776 | November 2010 | DiFonzo et al. |
| 8,038,581 | October 2011 | Sudeith |
| 8,770,857 | July 2014 | DiFonzo et al. |
| 8,777,634 | July 2014 | Kiani et al. |

BACKGROUND OF THE INVENTION

Every year psychology, medicine and other students, professionals, and researchers build custom mazes and structures, operational chambers, or other arrays to study behavior, memory and other areas with the help of animal subjects. This leads to expensive custom build products usually made of non-adequate materials and with fixed assembly not suitable for later research and studies. Those materials includes wood and wood-like products that tends to have a porous surface that leads to a hazardous growth of bacteria and other impurities, and also the use of bolted parts that form joints with the same stated problem. On the other hand, current solutions for mazes and research assemblies relies in the use of semi-modular or fixed sets which doesn't allow fully customized assemblies or are usable for a single study leading to an increased cost to researchers, students or institutions. This also leads to scientific replication problems because of when a research is replicated custom structures are hard to make (when not impossible to replicate and a reasonable expense)

This invention permits a true customizable set for mazes, operant chambers and similar arrays or assemblies along with a highly cleanable set that solves all the above-stated problems. The use of true modular components and a magnetically based assembly leads to a clean and true customizable system. The system also includes a safe magnetic switch-connector that is only electrically active when plugged, bringing safety to animals and other research subjects by avoiding external connectors, cables, and exposed metal terminals. This system can also hold custom arrangements, instruments or components to meet the most rigorous and demanding research setups. This system also uses small and compact components such as wall diaphragm doors that solve the problem of fitting in small spaces that is a critical matter in the current research facilities and behavioral research systems.

BRIEF SUMMARY OF THE INVENTION

The present invention is conceived to be used in a wide variety of applications, but mostly on behavioral, neuroscience and medical research arenas and related fields. The system is comprised of modular walls with magnetic edges, enclosed in profile extender fixtures, and a floor made of a material that exhibits magnetic properties as ferrous stainless steel.

The walls and floors can be assembled to any pattern by attaching to other walls or floors with the use of magnetic joints and then attaching to the floor or by attaching to the floor directly. The extensible magnetic edges, pillars, and joints are used to fill any gap to adapt to complex patterns when they are assembled and/or when wall or components available measures are not exact to match a required assembly pattern and when two or more walls needs to be attached together in complex angles.

The electrical system is formed by magnetic attachable/detachable electrical components where the electrical ground is placed on stainless floor base and positive current (VCC) is set on top rails, and wall edges using a metallic top pathway, enclosed in a plastic extruded rail and magnetic connectors. Those magnetic connectors on both top enclosed rail and wall edges are electrically inactive when no connector is attached and electrically active when such magnetic connector is attached. All the walls and components are assembled over a magnetically active material base system with magnetic edges. System components can then be powered by grounding on the floor and positive wiring on wall metallic pathway tops enclosed in the rails that have the mentioned connectors.

The system also uses small and compact components such as diaphragm wall doors and can use wire or wireless data control signals for activating different accessories to avoid extra spacing and exposed cables.

Rounded rods pillars (cylinder or bar type) with external enclosure are used to serve as joints to achieve different wall assembly angles when needed. Rods pillars are also used to carry positive wire electricity (VCC).

BRIEF DESCRIPTION OF THE DRAWINGS

The drawing shows different views of the invention. The drawing are intended to help the understanding of the properties, qualities and purposes of the invention.

F. Frontal view
T. Upper view
L. Side View

Figure 1:
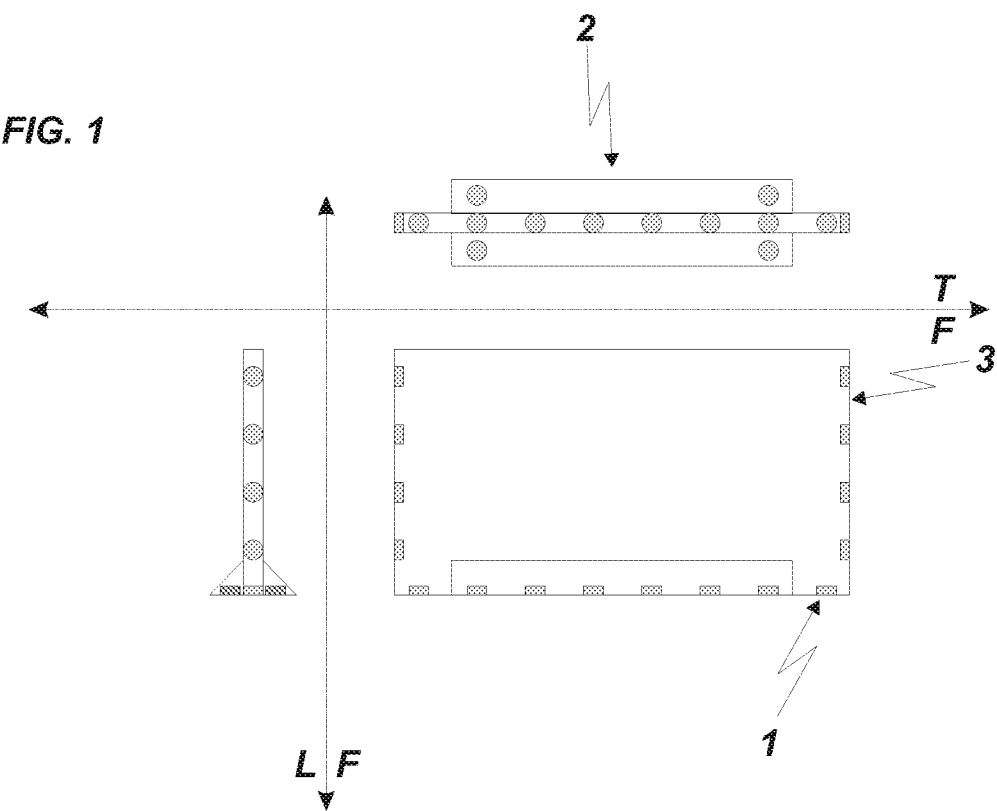
FIG. 1. Shows a bi-dimensional simplified layout of the invention with front, rear, upper, lateral, and cross sections auxiliary views of a simplified model of the invention without the electrical fixtures. As shown, the walls attach to the floor to form complex setups and arrays.
Figure 2:
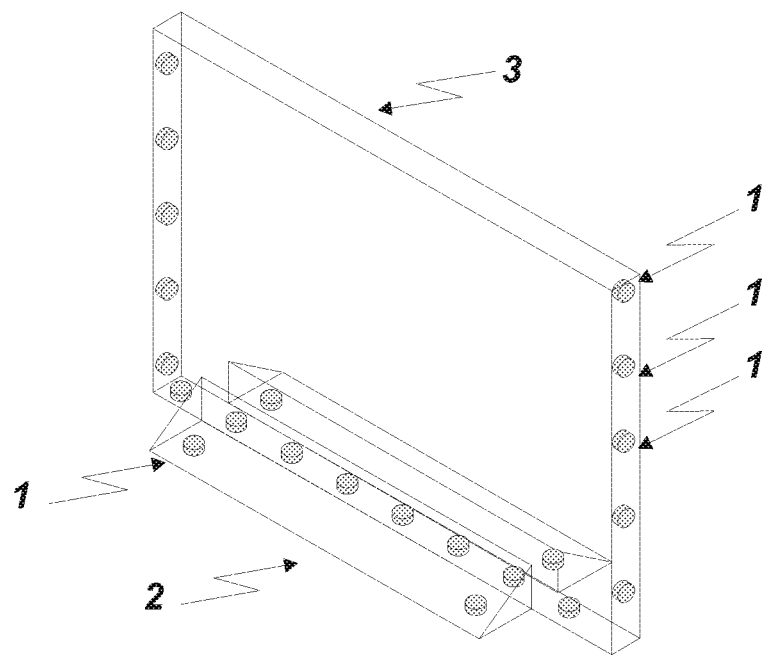

FIG. 2. Shows a tri-dimensional reconstruction of the magnetic wall system. As with FIG. 1, the walls are simplified to show the walls and the walls base support. Different aspects, measures or designs could be obtained by assembling walls together with floor system.

Figure 2A:
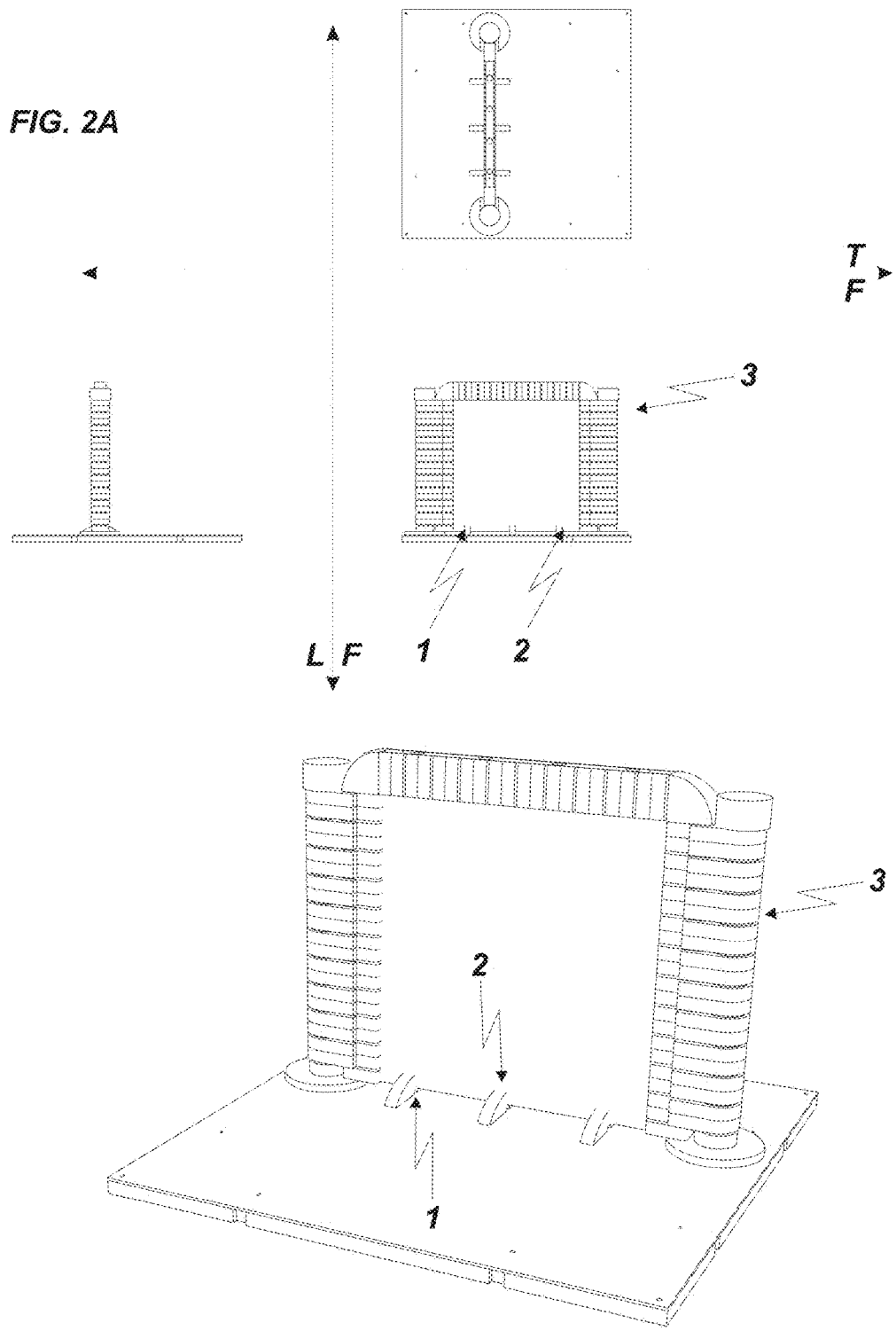
Figure 2B:
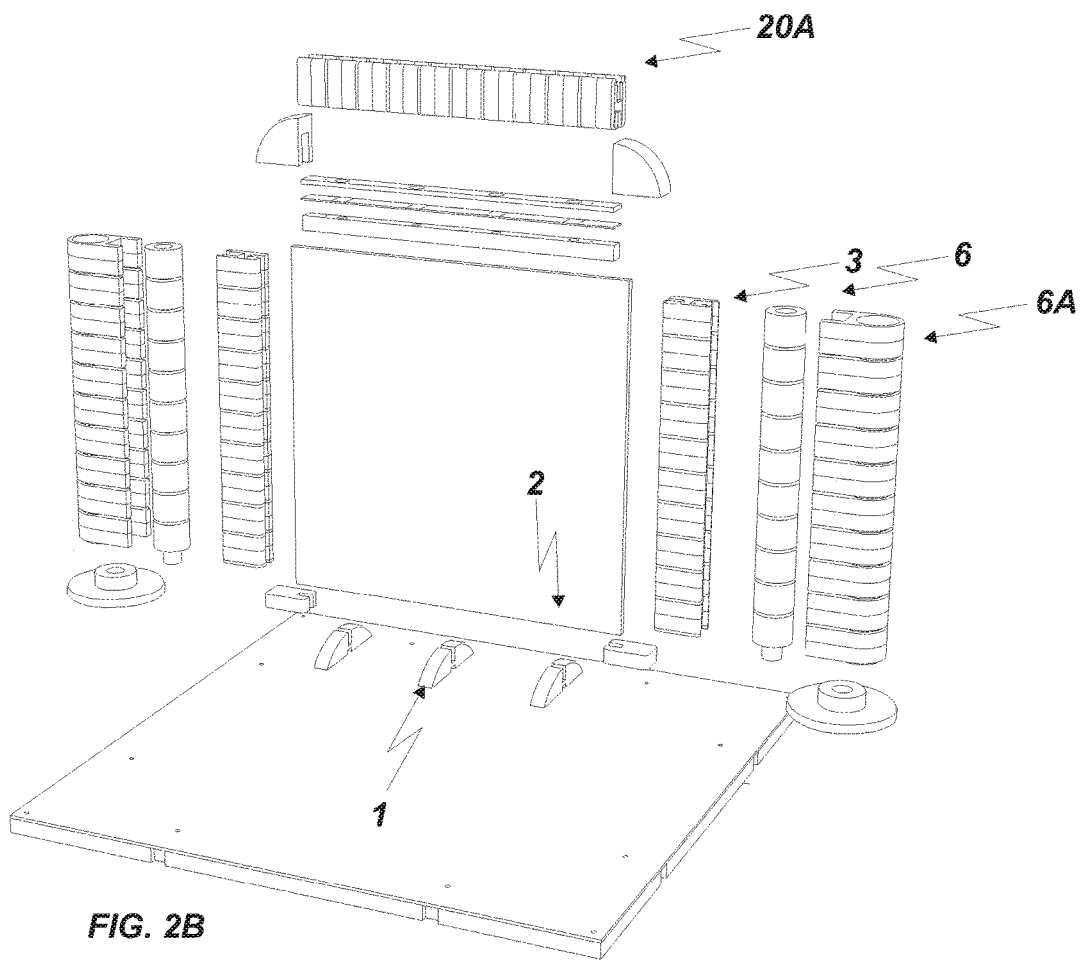

1. Neodymium Magnet. Rounded type. Square type or magnetic strip can be used
2. Beveled base support
3. Wall FIG. 2A. Shows a bi-dimensional reconstruction of the magnetic wall system. In this figure, the wall is shown with extruded rails on top and wall edges and with support pillars attached. As mentioned before different designs can be obtained joining pieces together to form different patterns.
1. Neodymium Magnet. Rounded type. Square type or magnetic strip can be used
2. Beveled base support
3. Wall FIG. 2B. Exploded view of a wall assembly over a base floor
1. Neodymium Magnet. Rounded type. Square type or magnetic strip can be used
2. Beveled base support
3. Wall
6. Pillar rods composed of rounded metallic pieces that assembly one to the other to extend the electrical conductance. Also, a fixed pillar can be used when fixed angles are desired.

Figure 2C:
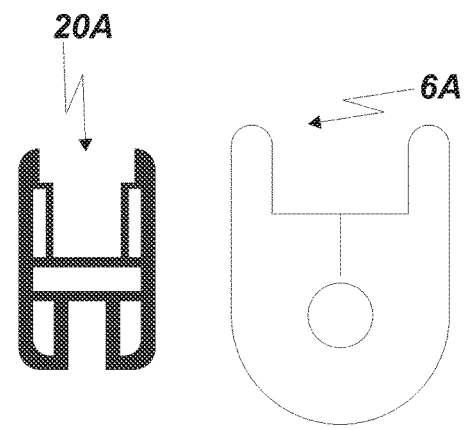

FIG. 2C. Sectional view of rails and pillar covers shown empty without electrical connectors or magnetic mechanism.
6A. Pillar rod's cover is made of non-conductive material rotating segments to avoid unintended electrical exposure.
20A. Rail and rail's cover. The rail conduces electricity from one side to the other of the wall extending the circuit run. The cover is made of non electrically conductive material to avoid unintended current exposure and to house the magnetic-switch connector assembly.

FIG. 3. Bi-dimensional plans of extensible magnetic edge joints.
4. Magnetic beam—terminal
5. Extendable joint components (walls)

FIG. 4. Shows a tri-dimensional reconstruction of extendable magnetic edge wall joints on a simple extension.
5. Extendable joint components (walls)

FIG. 5. Shows an exploded view of extendable magnetic edge wall joints extensions.
5. Extendable joint components (walls)

Figure 6:
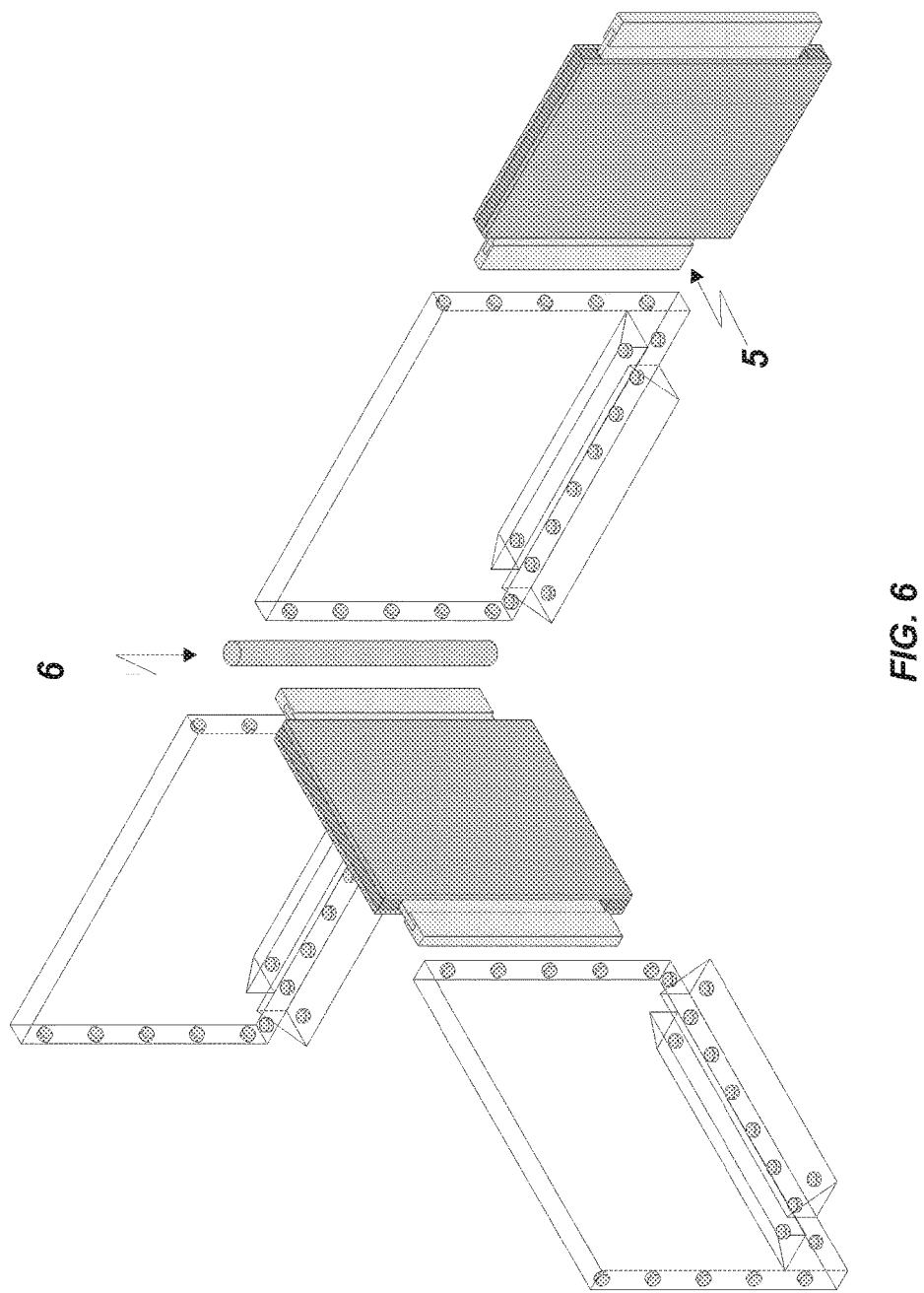
Figure 6A:
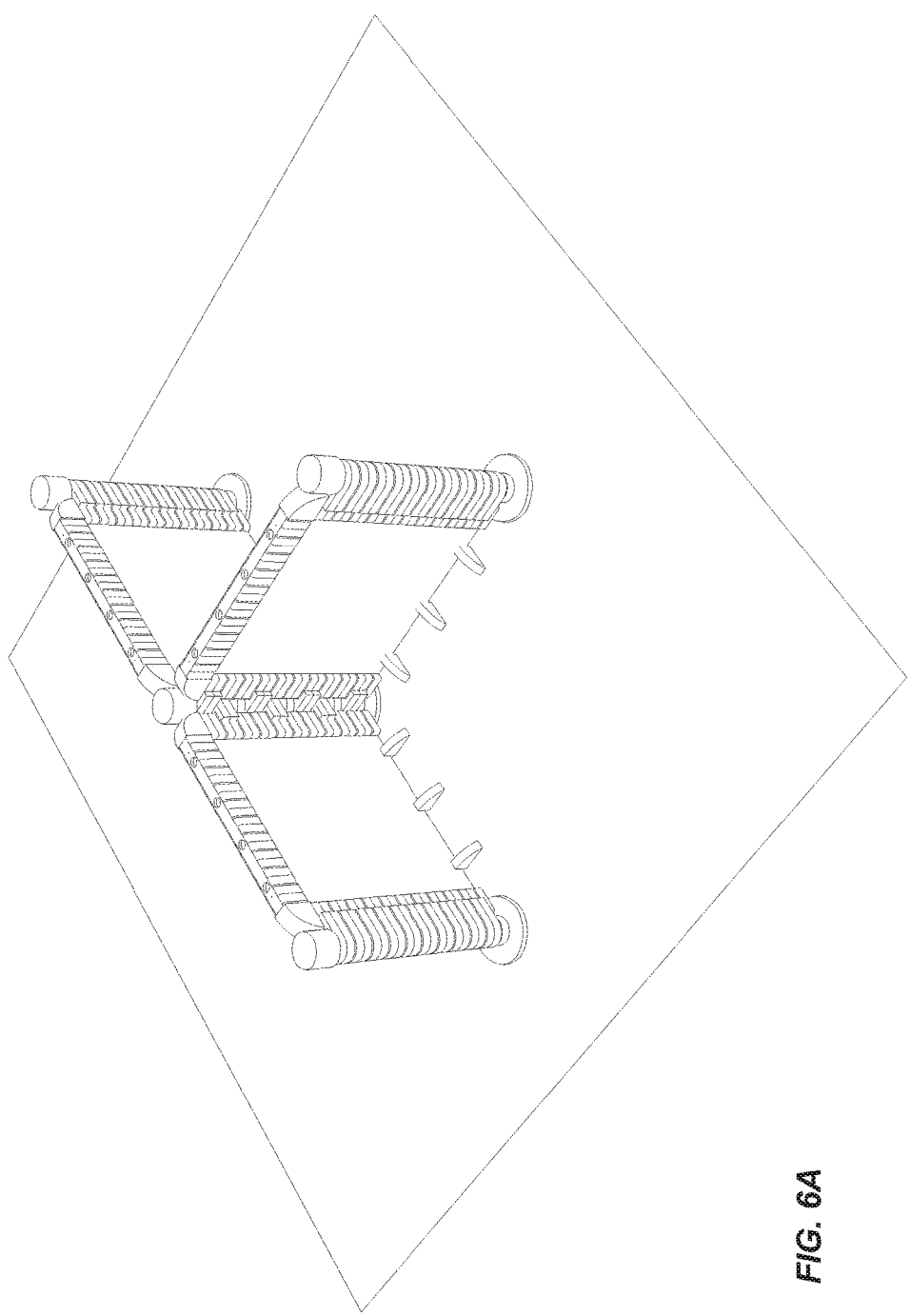

FIG. 6. Shows a tri-dimensional reconstruction of a simplified set of pieces working together without the electrical components. In this figure walls (3), extendable joints (4) and rods (5) are put together. It's important to clarify that rods are conceived to be used to produce joints that includes but extends to different angles as needed.
3. Wall
5. Extendable joint components (walls)
6. Rod joints FIG. 6A. Shows a tri-dimensional reconstruction of the set pieces working together shown with some electrical components: wall tops pillars and magnetic edges. The detail of the mechanism is not shown. In this figure walls, joints and rod pillars are working together. It's important to clarify that rod pillars are conceived to be used to produce joints in different angles including 90° or 180° degrees, but to almost 270° degrees set up.

FIG. 6B. Shows a bi-dimensional reconstruction of the diaphragm door used to avoid the space constraints in the behavioral and modular arrays.
21. Diaphragm door.

FIG. 6C. Shows a bi-dimensional view of wall diaphragm door.
21. Diaphragm door.

Figure 6D:
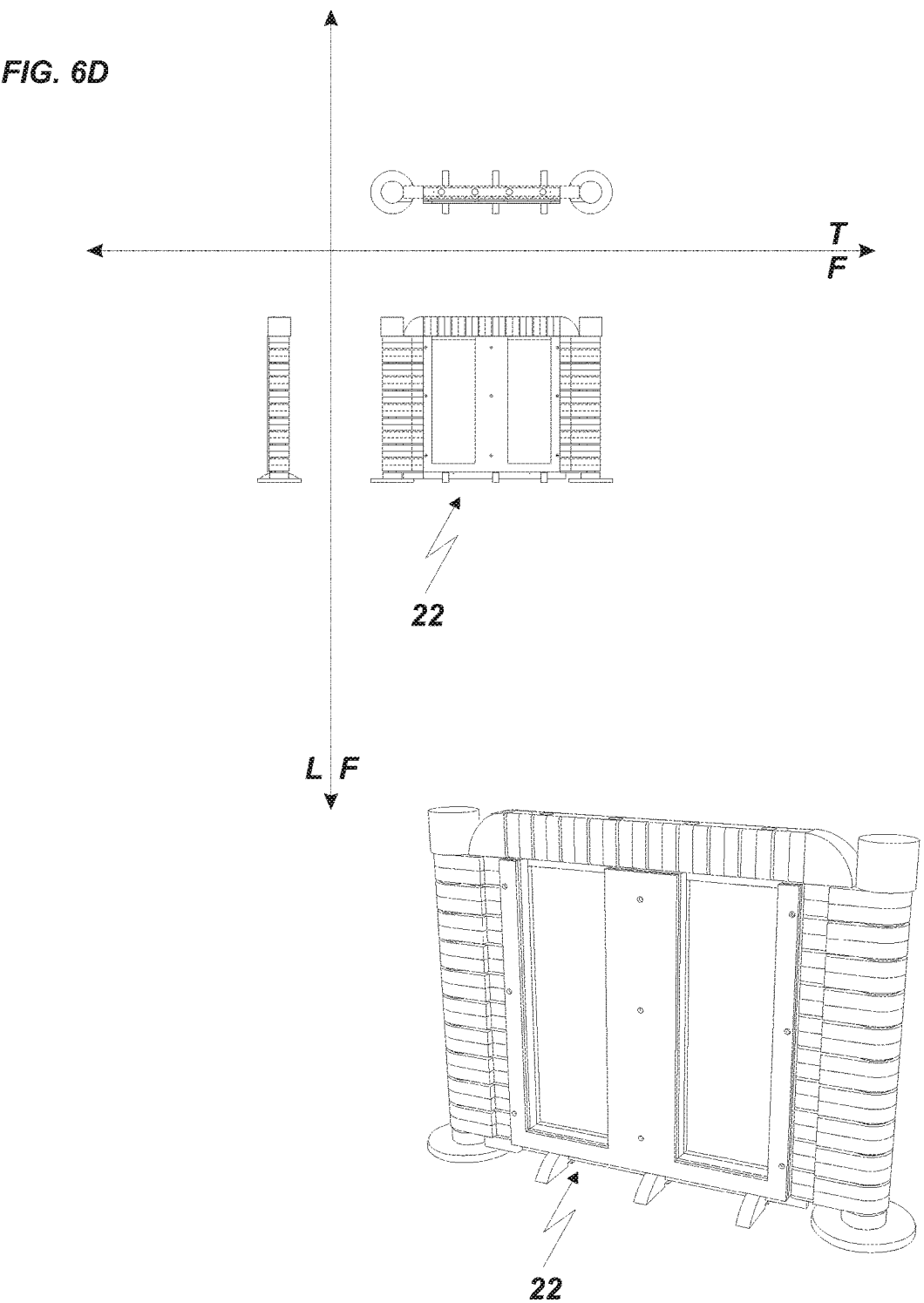
Figure 8:
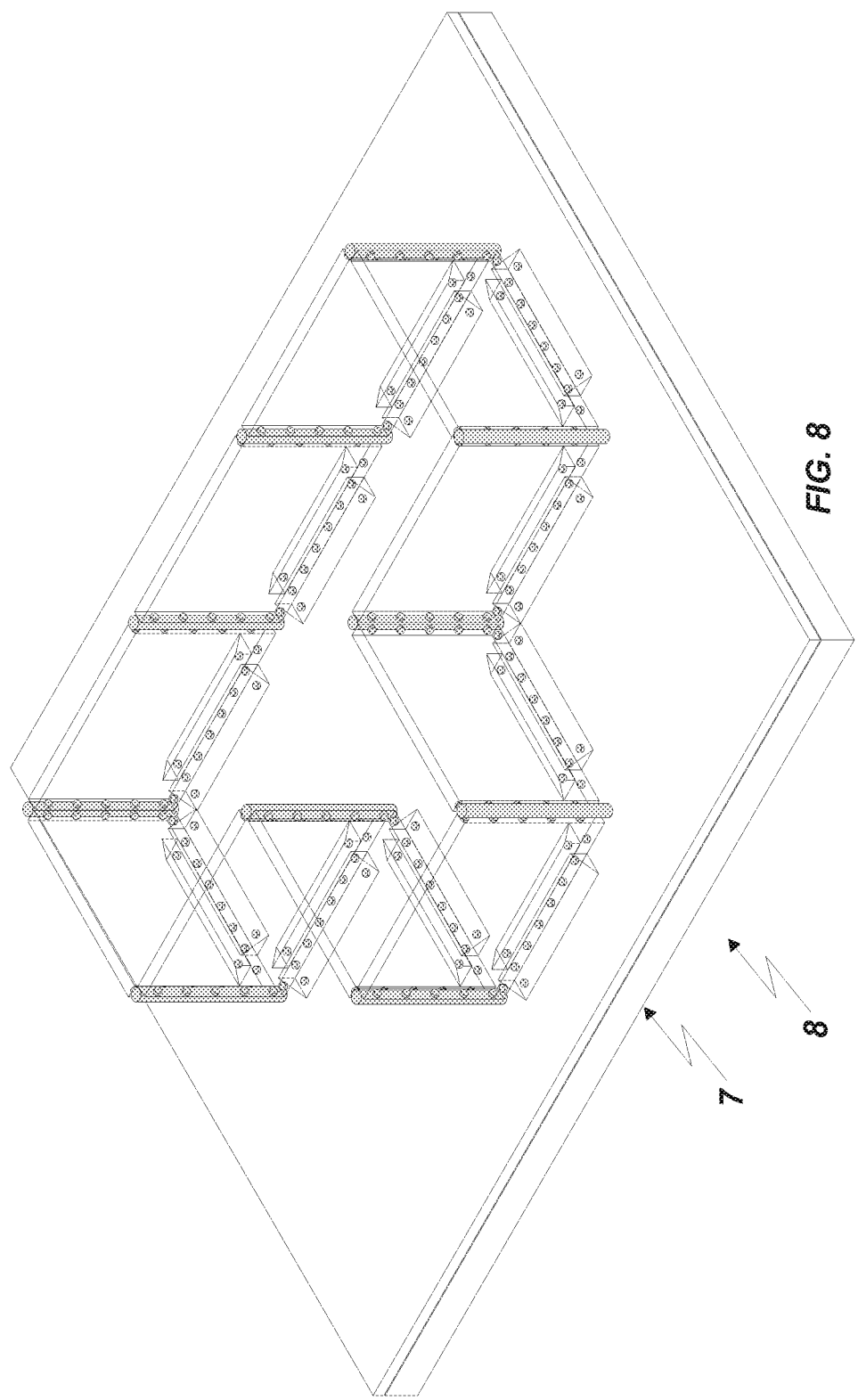

FIG. 6D. Shows a tri-dimensional view of wall with lateral rails to accommodate other components.
22. Wall with lateral rails FIG. 7. Shows a tri-dimensional reconstruction of the simplified set of pieces working together. In this figure walls (3), extendable joints (4) and rod joints (5) are put together in a specific pattern assembly. However, almost any kind of arrangement can be made changing wall sizes or forms. This specific figure shows a "T" pattern maze arrangement useful when studying election behavior.
3. Walls.
6. Rod joints FIG. 8. A "T" maze assembly of components set supported and fixed by magnets to magnetically active sheet floor support and base.
7. Stainless steel or similar magnetically active base plate (using a magnetically active Stainless steel alloy, or other magnetically active and conductive material as ferrous ones).
8. Inert base support. This base could be made of a thermoplastic with high dimensional stability such as a laminate of HDPE acrylic or other polymers (non-electrically conductive).

Figure 8A:
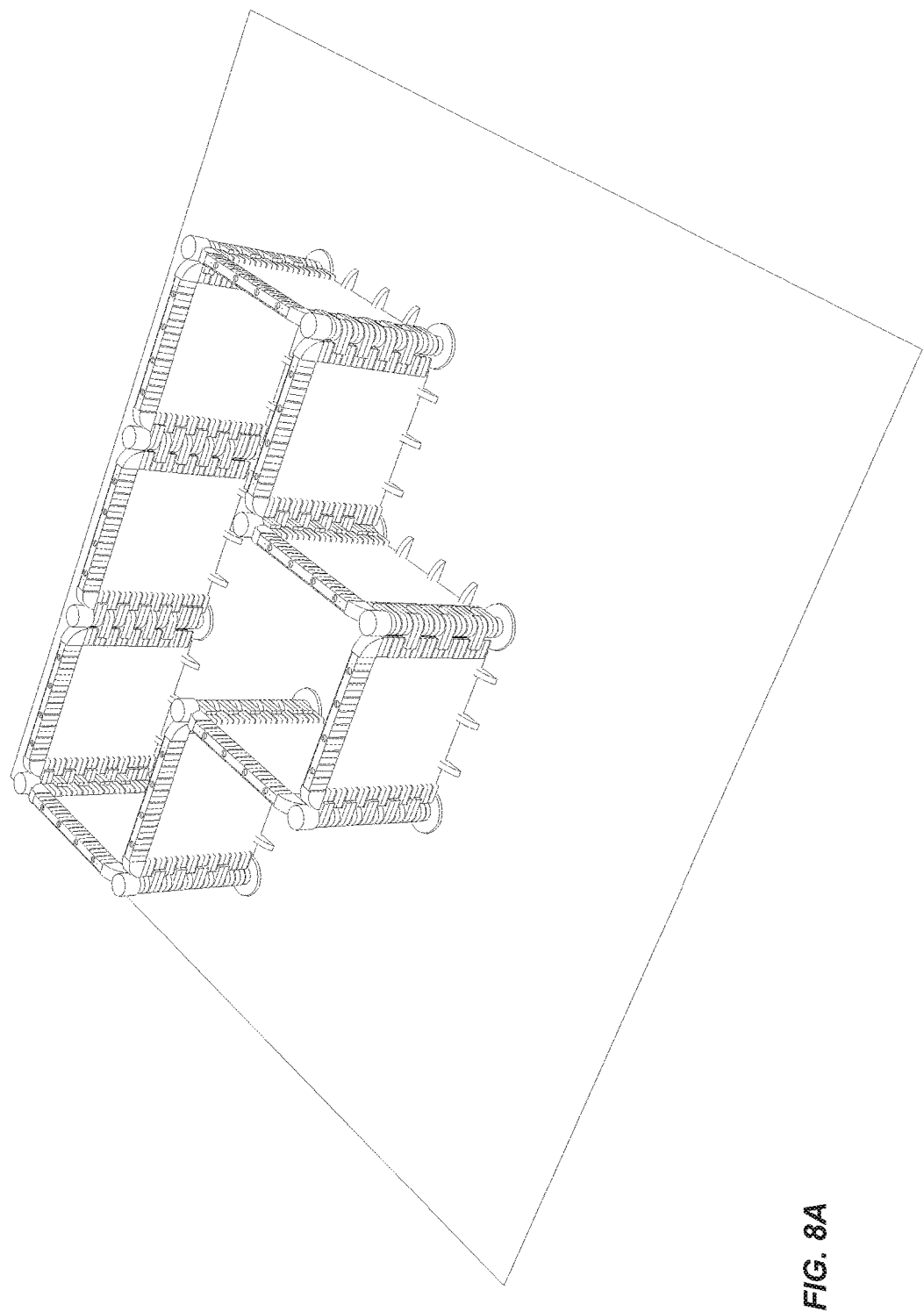

FIG. 8A. A "T" maze assembly of basic components set shown with usual components of the system.

FIG. 9. A simplified view of components shown with basic electrical components. Magnetic power adapter plug, frontal, top and lateral view. A part of the electrical system. This power adaptor provides split electrical wires with ground (−) (FIG. 9 number 12) going to the base (FIG. 8 number 8) and positive wire (p.e. +28 VDC, FIG. 9 number 10) to the upper contact wire. Both wires has magnetic joints and active switches (FIGS. 9, 10 and 11 number 9, 11 and 13) and a switch mechanism (FIG. 10 number 15) that permits the electrical union between the actual wire input (FIG. 10 number 17) and the electrical switch contact (FIGS. 9, 10 and 11 numbers 10 and 12).

FIG. 10. Shows a sectional view of the power adapter plug.
9. Magnetic connector basic functioning. This magnetic ring helps the wire contact to firmly attach to rod joints. The magnetic ring is enclosed in the rail and covered with the rail cover or corner covers.
10. Internally movable positive wire contact. (p.e. +28 VDC). This wire contacts to rod joints or is included as part of the edges and is covered by rail covers. This magnetic connector—switch mechanism is shown in the active, extended position when the two layers, the inactive and active ones are connected, whereas the retractable negative wire connector (12) is shown in the inactive position. Activation is done when a magnet or a magnetically active surface is attached to the connector that is otherwise inactive, connecting and bridging the two layers mentioned.
11. Magnetic connector. Disk type or other types. Provides extra attachment to the base plate (non-wired).
12. Internally movable negative wire contact. (− Ground) this wire contacts to the base plate. Shown in the inactive state where the actual connector is separating the two layers.
13. Magnetic connector. This magnetic ring helps the wire contact to firmly attach to the base plate.
14. Wire cable. This wire cable goes to the actual power adaptor. (p.e +28 VDC, 3 amps. Approx) The wire can be replaced by the active and inactive layers of the magnetic switch connector system if desired.

15. Rubber support for cable wire (this forms part of the rail cover on end components).
16. Spring. This spring permits the displacement of wire contacts and connects wire contacts, within the enclosed magnetic switch connector, to actual wire inputs that are parts of the magnetic switch connector. This system differs from past solutions and systems where spring or other mechanisms are used in a compression setting while the present invention uses complete movable connectors with extension springs that permits the internal connection of the two layers of magnetically inactive connectors in a move toward the actual internal connection and not the compression of it as a mean of adjustment. It also differs from previous solutions by using the magnetic system to actually activate the connector that is otherwise inactive and thus safer than previous solutions.
17. Wire input. Can be connected to a small PCB that connects to spring.

FIG. 11. Tri-dimensional view of power adapter plug.
9. Magnetic connector. This magnetic ring help the wire contact to firmly attach to rod joints.
10. Inactive terminal of positive wire contact (+28 VDC) This connector contacts to rod joints but is electrically inactive when no magnetic connector is attached.

Figure 12A:
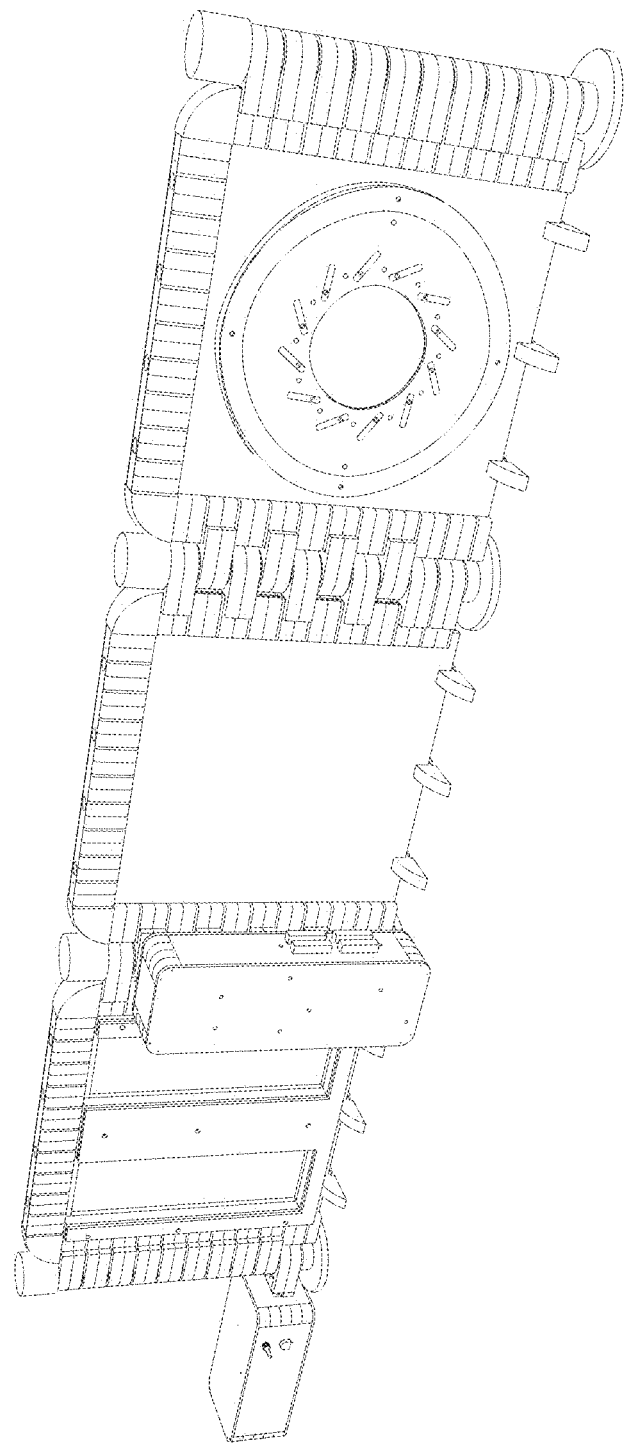

FIG. 12. Tri-dimensional view of the electrical system working together along with covers, switch connectors and enclosures. This view also shows the use of a diaphragm type door that can operate in small and tight spaces and also allows small form factor for production.

Figure 13:
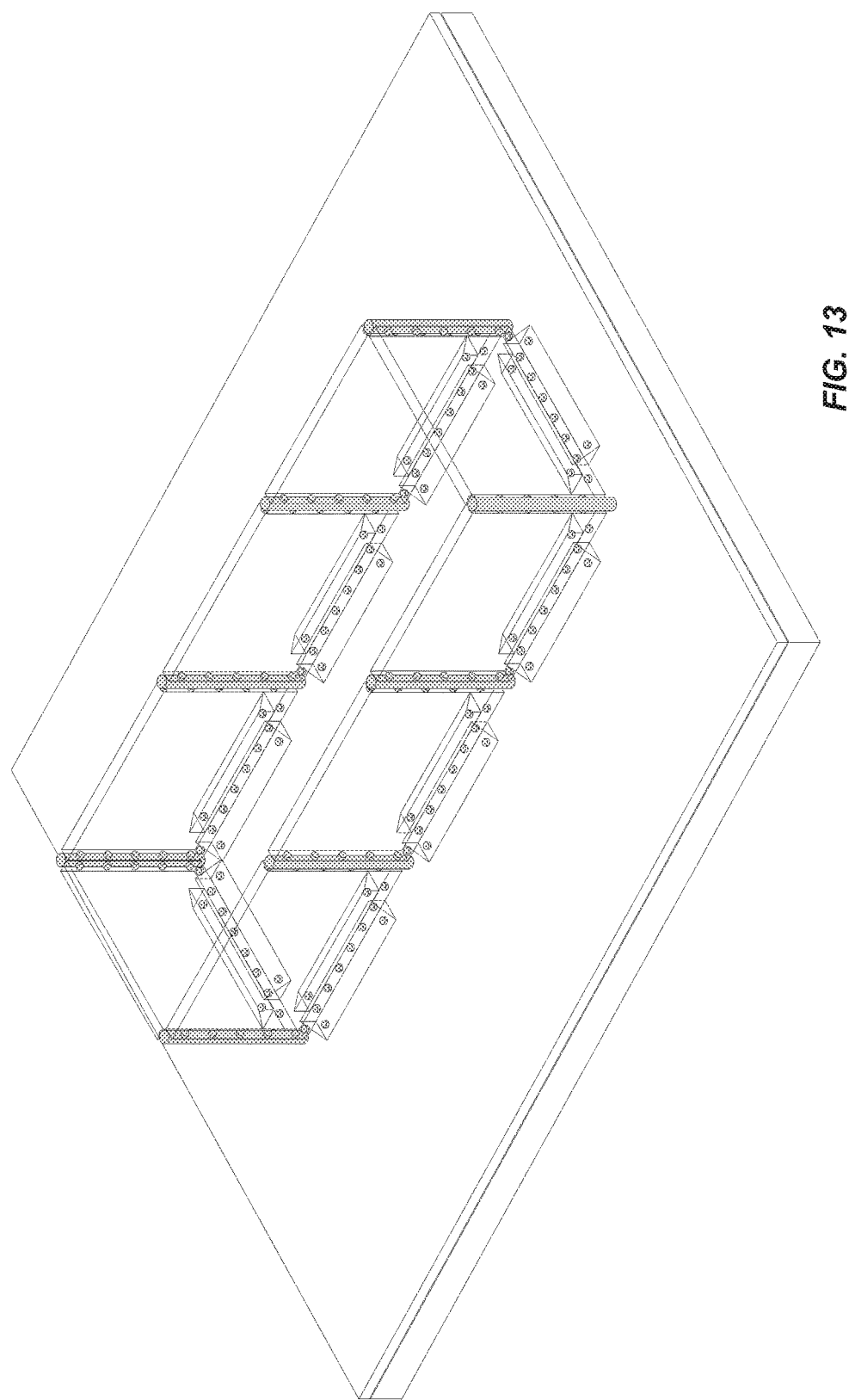
Figure 13A:
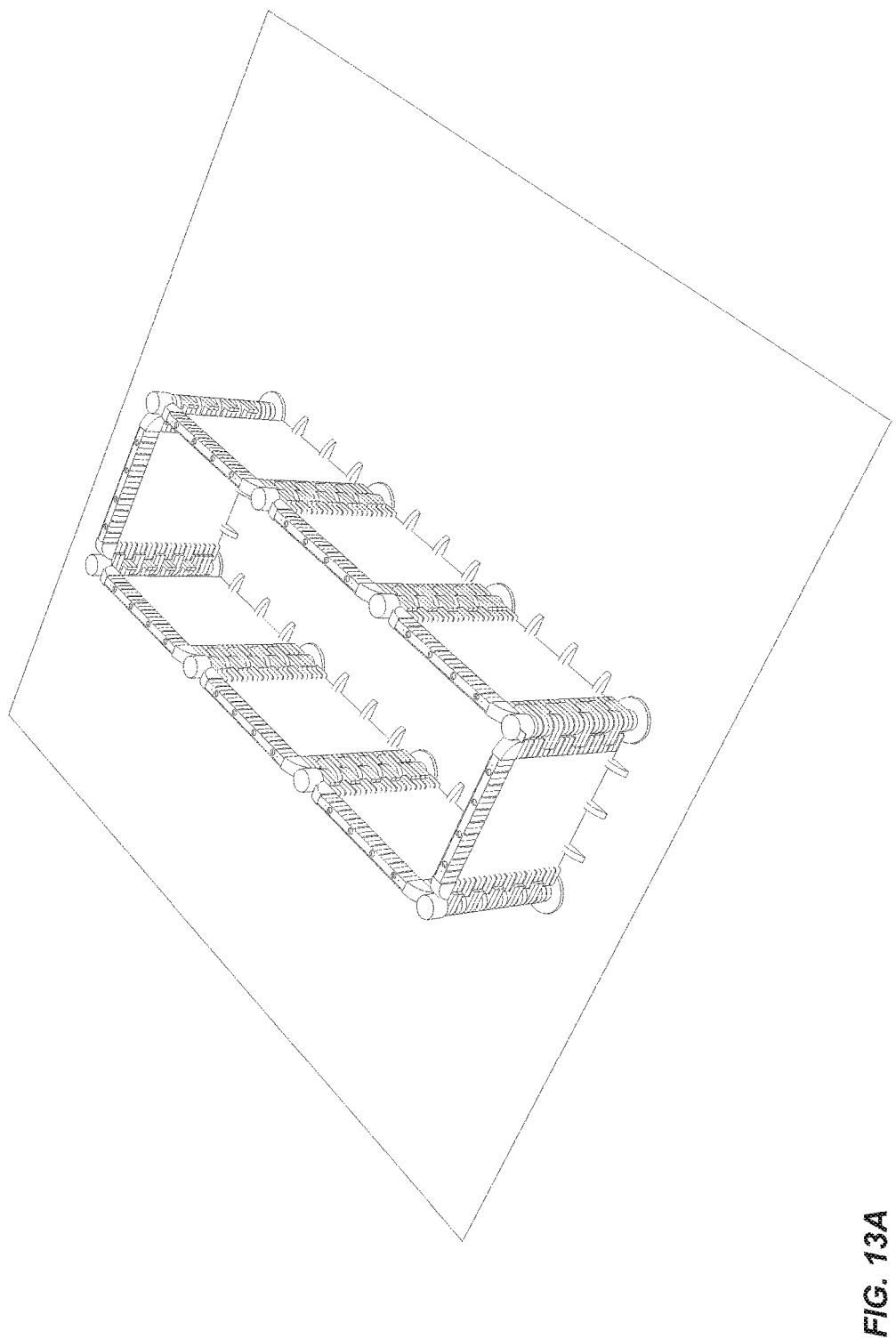
Figure 14:
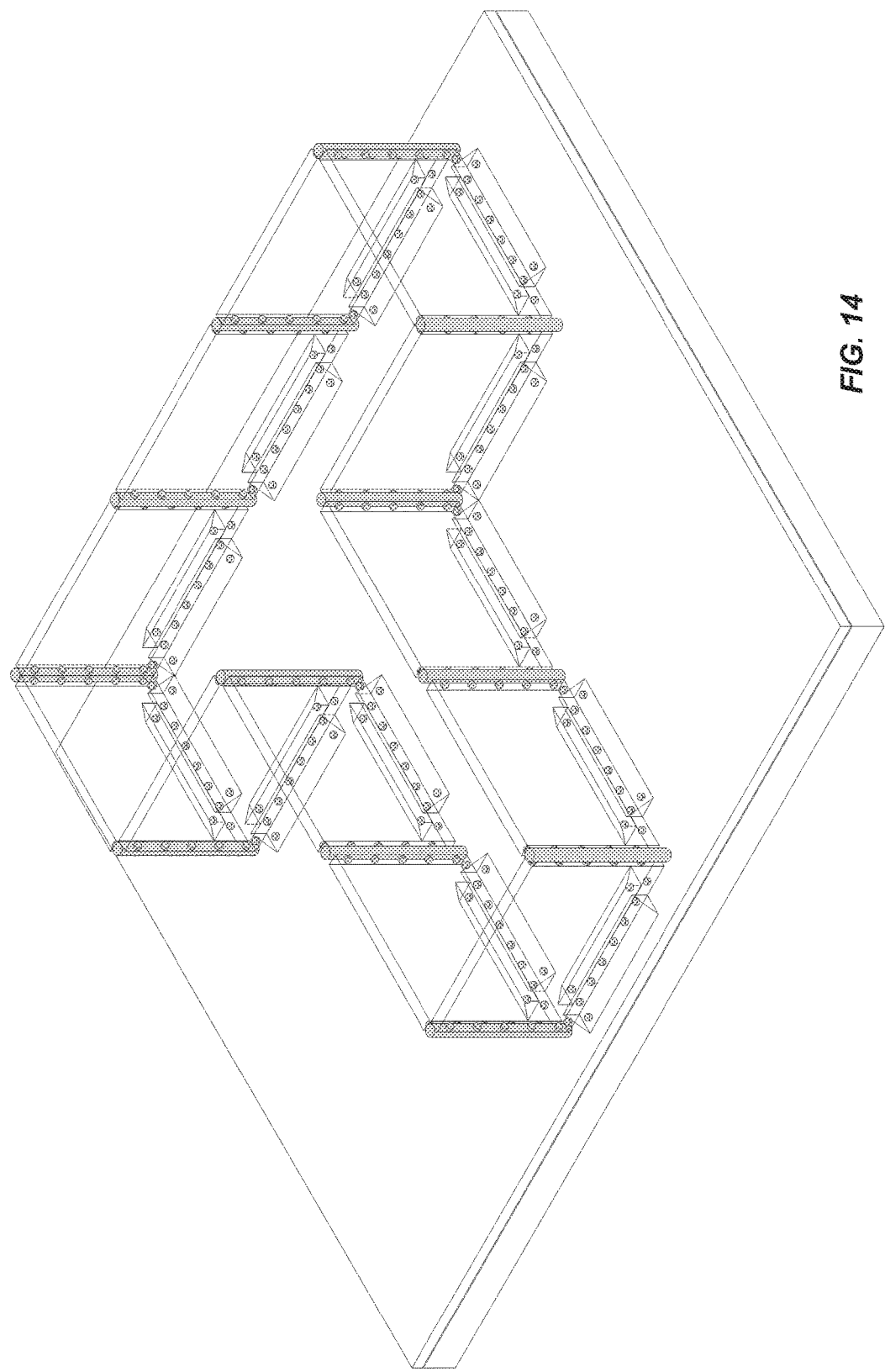
Figure 14A:
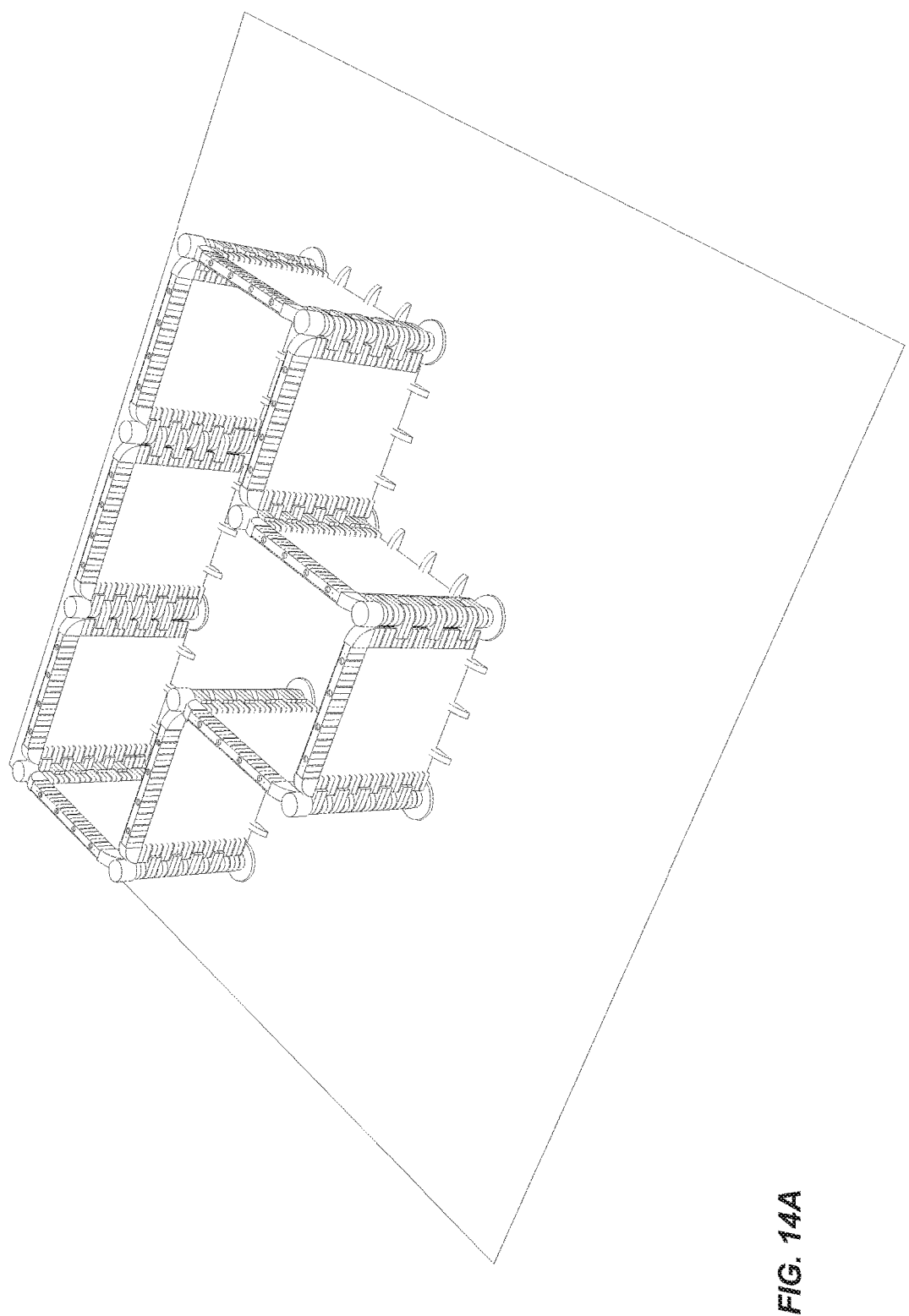
Figure 15:
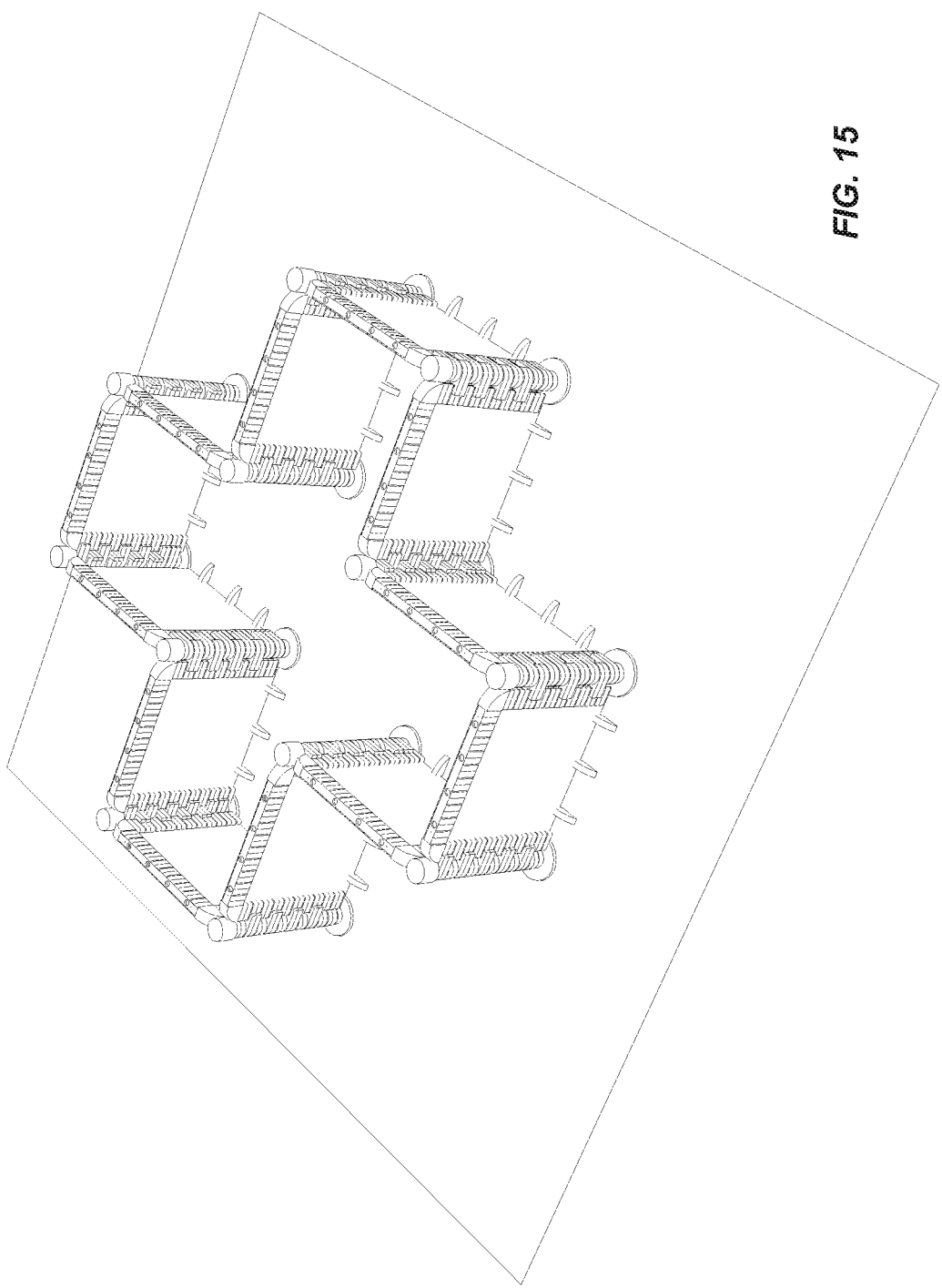

FIGS. 13. 13A. 14, 14A. 15. Tri-dimensional view of system arrangements. FIG. 13 represents a square arrangement, while FIG. 14 a "T" shaped assembly, and FIG. 15. a plus "+" assembly. System components can be arranged in practically any way.

Figures 16, 16A:
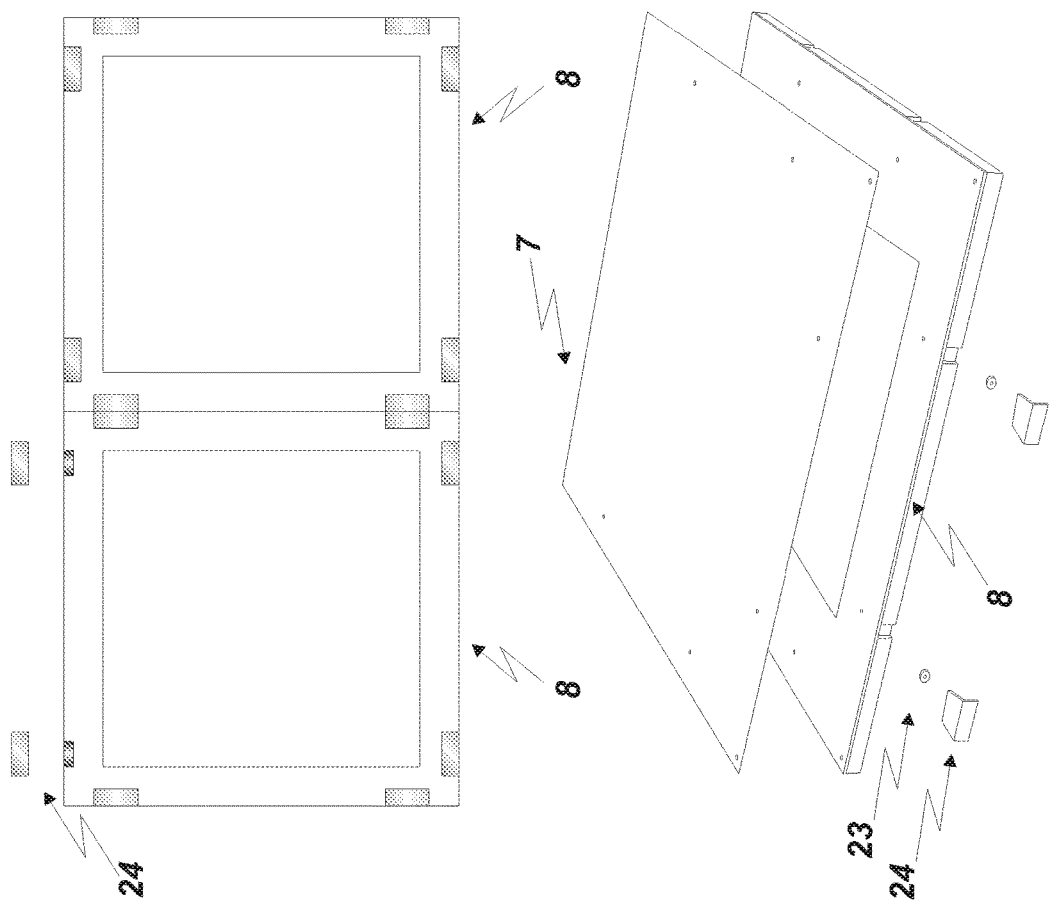

FIG. 16. Floor base assembly with magnetic edges. This base system is used as tiles to array in different shapes and patterns and accommodate the system configuration. The figure shows the non-electrical conductive base along with magnets (23) and the electrically conductive plates "L" shaped that (24) joints magnetically together and conducts the electrical ground from the base plate (upper surface—7) and the edges.

7. Electrically active ferrous material base.
8. Electrically inert polymer base.
23. Magnets
24. Edge electrically conductive plates.

FIG. 16A. Tri-dimensional view of the base components exploded.

7. Electrically active ferrous material base.
8. Electrically inert polymer base.
23. Magnets
24. Edge electrically conductive plates.

Figure 17:
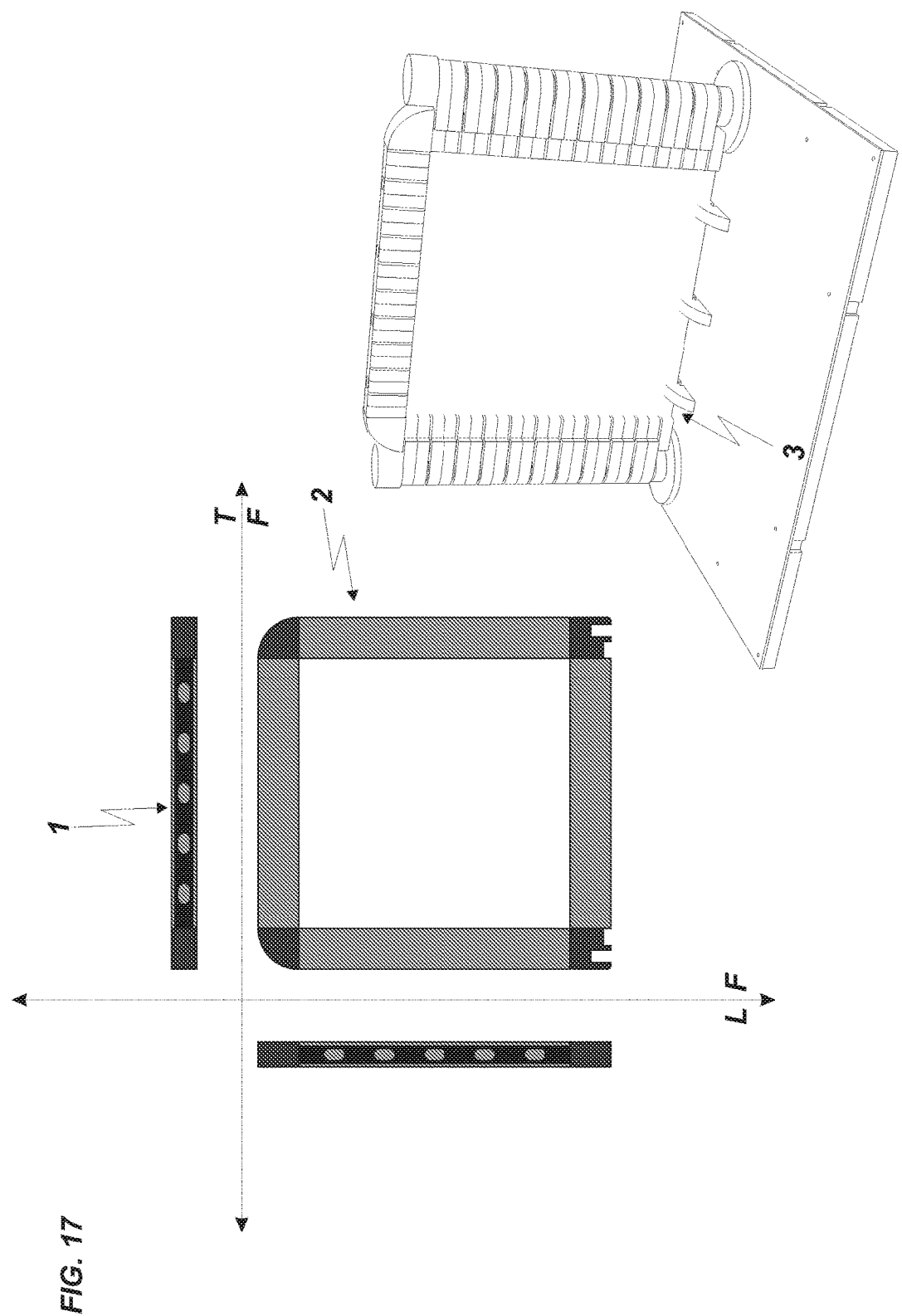

FIG. 17. Bi-dimensional and tri-dimensional view of produced components along with covers, edges, and corners.

1. Electrically conductive edges with magnetic switch connector and cover.
3. Wall support legs with magnets.

Figure 18:
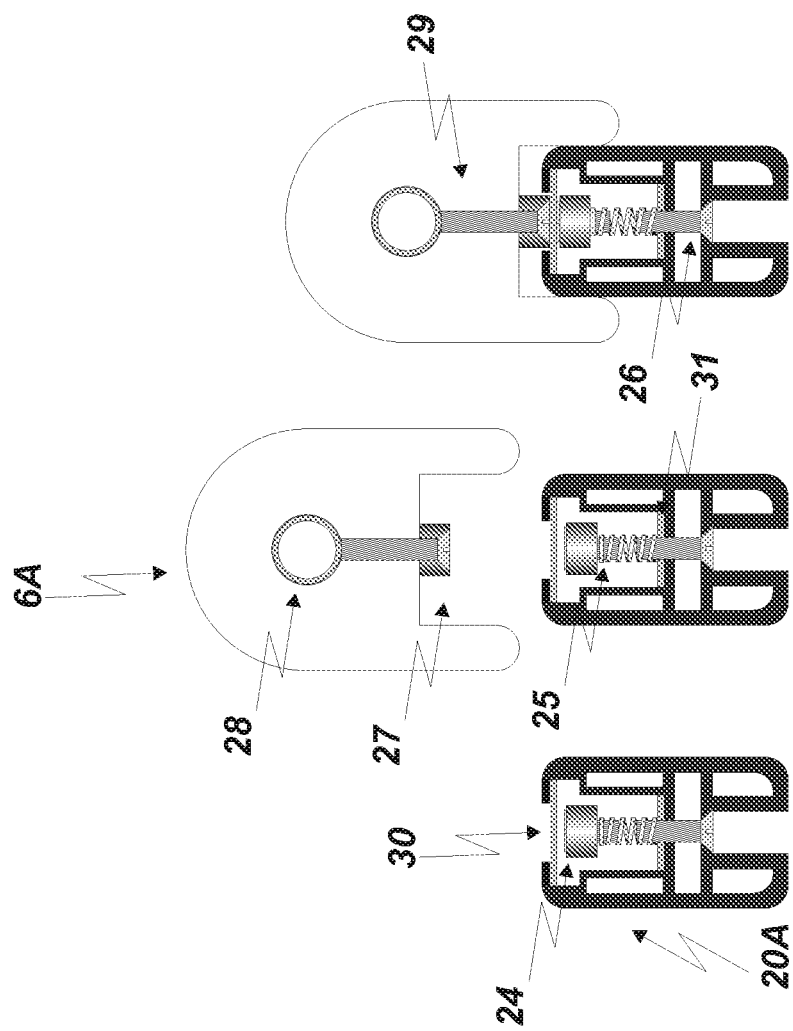

FIG. 18. Pillar rod with covers and mechanical components with wall edges and magnetic switch connector. Note that spring that holds the switch—connector is pulled from the inert position, conducting electricity from the active layer, to the active position where electrical current is therefore conducted to inactive layer activating it by means of magnetic pulling force. This action turns the inert layer to the active state by conducting the positive current from active layer to the inactive layer and "activating" it.

6A. Pillar rod assembly with mechanical and electrical components.
20A. Rail cover with mechanical and electrical components.
24. Magnet. Conducts current from active layer through screws and springs.
25. Spring. Returns the magnet and connector to the initial state when the rod-pillar magnet is detached and conducts electricity from rod-pillar to rail and from rail to rod-pillar as needed when the switch connector is activated by the means of the magnet.
26. Screw. Fixates rail, cover and layer (active) to the spring and magnet—connector.
27. Magnet. To activate the switch-connector and turn it to the active state.
28. Pillar—Rod. Inner view
29. Screw to communicate rod—Pillar segment to the magnet and fixate the segment with the cover.
30. Inactive layer. Made of non-magnetic metal (i.e. aluminum, brass, etc). This layer acts as a wire and conducts electricity when the switch is turned on by attaching the edge to the rod-pillar that has a magnet on it.
31. Active layer. Made of non-magnetic metal (i.e. aluminum, brass, etc). This layer also serves as an electrical wire and conducts electricity at all the times when powered. Note that the switch can be used for normally open or normally closed settings switches. This layer activates the inactive layer when the switch is closed. And connector is pulled by the magnetic force from the inactive to the active state.

DETAILED DESCRIPTION OF THE INVENTION

This invention comprises the general system for a magnetic modular set of walls, floor and other components to assembly modular mazes and other arrays to make behavioral studies.

Walls can be made of different materials according to specific needs but those materials can be classified in two: a) Magnetically active materials, and b) Magnetically inert materials. It is proposed to use either polycarbonate sheets with a thickness of at least ¼" inch or acrylic plastic or other inert material for wall production. Sheets are routed or cut down to small pieces of the required size to make modules. Once walls are made, high power magnets are glued, bolted or affixed to bottom edges and also wall top and lateral edges through the use of the rail and rail covers with the switch connector to complete each wall mechanism along with the pillars and connectors to produce an assembly. Wall bottom edge should have magnets of the same pole facing the floor to guarantee the highest attraction between walls and floor when assembly them together.

It is proposed to add a short base to each wall to add stability and diminish torque over each wall if pushed horizontally. The base can be made of the same material walls are made. In this case, a set of magnets should be added to wall base to add strength to walls assembles over the floor. A beveled edge is preferred for wall base as this reduces the area occupied by the base.

Walls are finalized on each side but the bottom side with a rail system with the magnetic switch connector system enclosed. Bottom side uses a magnetic edge and support without electrical connector so wall bases remain electrically inert.

Walls can be made of different materials tinted or clear depending upon needs. Wall system also uses extendable edge joints to adapt to specific measures not covered by standard pieces.

The use of this device can be extended to virtually any kind of modular construction (toys, provisional constructions, stands and other low weight assembly). The set can be used many times, and assembled and disassembled as required. Due to the inert nature of the wall and lower base components (p.e polycarbonate, acrylic, etc.) this set can be sanitized and cleaned to keep the system set accordingly to standard guidelines for animal, or behavioral research, a characteristic not found in current systems which commonly uses porous materials as wood, or glued materials that leads to microscopic joints that tends to be populated by bacteria. This system set resolves both the sanitation problem and the need for a modular component when it comes to behavioral studies. It also solves the problem of electrically active terminals that are dangerous for animals and humans. Current modular systems rely on mechanical fastenings that reduce configuration possibilities and at the same time this difficult the cleaning process by leaving drilling holes, nuts and bolts holes etc.

Extendable joints comprises two basic parts: a) Rod joints either solid or tubular, and b) Extendable wall joints. Extendable joints are simply made of a magnetically inert material with magnetic edges that are mechanically extendable according to drawings. The parts can be cut or routed and glued to make the final piece.

The Floor is made of a sheet of magnetically active material such as ferrous stainless steel over an inert polymer base made of a low flexibility material with high resistance to water as HDPE (High Density Polyethylene). The base isolates any electricity it may be circulating and at the same time gives a rigid support to the set. The base can be cut or routed to any shape needed, but a square pattern is preferred to add modularity. The base edges are cut and beveled in opposite edges and a set of magnets are placed in each bevel or union to make the union between bases if a larger arrangement is needed. Electrical continuity between floor tiles is obtained with metallic parts and magnets to complete the electrical set of the system described in the next paragraph.

The Electrical system is set by adding the electrical ground to the floor and the positive wire to rail top and edges system with the magnetic switch connectors for each wall and edge but bottom edge (that remains inert always). It's also desirable and part of this invention to add positive wire terminals to the rounded rod pillars enclosed in the covers to avoid the accidental touch of the terminals when connected to a wall. A switch connector or each component is available and attachment is obtained when the magnetic terminal is attached to the switch connector turning this switch on and thus powering the component. This type of magnetic driven switch connector system minimizes the risk of touching electrically active contacts for both humans and animals because with this solution connectors are always inert (non-powered state) except when actually connected. This magnetic driven switch connector differs to other connectors by being: a) inactive and electrically inert when not plugged and b) activated and having electrical current only when the magnetic connector is attached to it. Other magnetic connectors of other inventors rely upon the use of the magnets only to hold and support the connectors together and to align the terminals but being those terminals electrically active at any time.

Rounded rod pillars (cylinder or bar type)are used to serve as joints to achieve different wall assembly angles. Rods are also used to carry positive wire electricity and used to activate the switch connectors to conduct electrical power from one wall module to the other. Pillars are protected with the pillar cover hereby presented or by either an insulating material, paint or other insulating means and connected to the wall edges with magnetic terminals that activate the switch connectors turning the pillar in an electrically active component.

For the overall system, strong but small magnets are recommended. At this moment rare-earth (neodymium NIB, Nd2Fe14B) magnets are suggested for this use due to its strong magnetic properties, but other types of magnets along with new type of magnets can be used.

This system uses modular components as walls, floor rod pillars, extendable joints and different power adaptors and therefore is meant to be used to make virtually any assembly it may be needed. The system also includes compact components as door walls diaphragm type It's also possible to add reward components and monitoring components if needed. Each component will be powered by the electrical system described and should also have an independent switch connector for each component whether it's an input or output electrical signal or current.

This modular system is suitable for other types of arrangements where provisional arrangements are needed and non-structural high strength assembly can be used.

The invention claimed is:

1. A magnetic modular assembly system for creation of behavioral research apparatus or other modular building structures, comprising:
    a plurality of walls, floor bases, extendable joint components, rods, electrical system components, magnetic switch connectors, and diaphragm doors;
    said walls being made of an inert polymer and having magnetic edges;
    said floor bases being made of a magnetically active ferritic metal that permits a magnetic adherence of said walls to said floor bases or to each other to create a pattern for a complex maze setup or structure;
    said floor bases further comprising magnetic edges that permits a connection between adjacent said floor bases;
    said extendable joint components having magnetic edge components slidably mounted therein and configured to extend to connect said walls to specific measures not covered by components of said system;
    said rods being made of magnetically active material and configured to join to said magnetic edges of said walls to achieve wall joints at virtually any angle, either in a fixed or movable factor;
    said modular system being powered by said electrical system components having magnetically attachable and detachable parts;
    said magnetic switch connectors attached to each edge, except the bottom edge, of each of said walls, each of said magnetic switch connectors having two parts, a first and a second part;
    said first part being a magnetic electrical terminal;
    said second part having two layers of electrically conductive metal or other electrically conductive materials, a first layers being electrically active and powered and a second layer being electrically active but with no electrical power unless activated by said first part of said magnetic switch connector; said second part of magnetic switch connector having a retractable mechanism that, when pulled by magnetic force of said first part, bridges said first and second layers of said second part connector communicating them and electrically activating the second layer and permitting the circulation of electricity between said first and second layers, said first part of said magnetic switch connector bringing both usability and safety to the system by permitting a safe connection between walls and a fully inactive safe state when not intended to be used or when disconnected; and said diaphragm doors configured to attach to said walls and powered by said electrical system components.

* * * * *